US012716816B2

(12) United States Patent
Michikita et al.

(10) Patent No.: US 12,716,816 B2
(45) Date of Patent: Aug. 25, 2026

(54) TEST SYSTEM, TEST METHOD, AND NON-TRANSITORY COMPUTER READABLE MEDIUM FOR TEST SYSTEM

(71) Applicant: HORIBA, LTD., Kyoto (JP)

(72) Inventors: Toshiyuki Michikita, Kyoto (JP); Hiroshi Kawazoe, Kyoto (JP); Kazuki Furukawa, Kyoto (JP); Yoku Hirose, Kyoto (JP); Kenji Shiomi, Kyoto (JP)

(73) Assignee: HORIBA, LTD. (JP)

( * ) Notice: Subject to any disclaimer, the term of this patent is extended or adjusted under 35 U.S.C. 154(b) by 56 days.

(21) Appl. No.: 18/292,121

(22) PCT Filed: Jul. 25, 2022

(86) PCT No.: PCT/JP2022/028632
§ 371 (c)(1),
(2) Date: Jan. 25, 2024

(87) PCT Pub. No.: WO2023/008373
PCT Pub. Date: Feb. 2, 2023

(65) Prior Publication Data

US 2024/0337564 A1 Oct. 10, 2024

(30) Foreign Application Priority Data

Jul. 26, 2021 (JP) ................................ 2021-121884

(51) Int. Cl.
*G06F 21/57* (2013.01)
*G01M 17/007* (2006.01)

(52) U.S. Cl.
CPC ......... *G01M 17/007* (2013.01); *G06F 21/577* (2013.01)

(58) Field of Classification Search
None
See application file for complete search history.

(56) References Cited

U.S. PATENT DOCUMENTS 5,524,476 A * 6/1996 Tedeschi .................. G01N 1/22 73/23.31
6,021,366 A * 2/2000 Fieramosca .......... G01R 31/007 701/34.3

(Continued)

FOREIGN PATENT DOCUMENTS

CN 1621990 A 6/2005
DE 102010017198 A1 12/2011

(Continued)

OTHER PUBLICATIONS

International Search Report dated Oct. 11, 2022 issued for International application No. PCT/JP2022/028632.

(Continued)

*Primary Examiner* — Paul R Fisher
(74) *Attorney, Agent, or Firm* — Brooks Kushman P.C.

(57) ABSTRACT

A test system that conducts a test of a test subject that is a vehicle or a part thereof that includes an electronic control device, comprises a drive test device for conducting a drive test of the test subject, an automatic driving robot that drives the test subject, and a signal control unit that is connected to the test subject by wire or wirelessly and that transmits, to the electronic control device, a test signal for evaluating the electronic control device.

10 Claims, 5 Drawing Sheets

(56) References Cited

Figure 1:
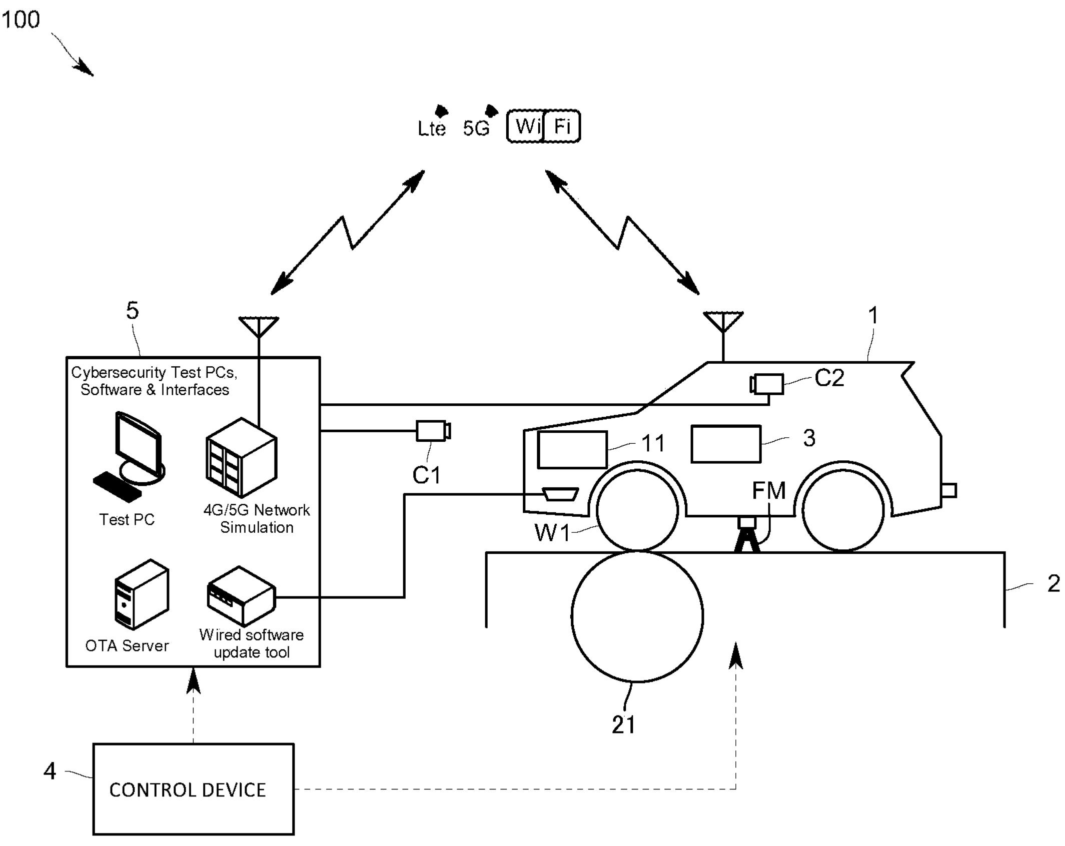

U.S. PATENT DOCUMENTS 7,522,884 B2 * 4/2009 Turner ................ G06F 11/3692 455/67.14
9,009,013 B2 * 4/2015 Krainz .................. G05B 17/02 703/7
2002/0134169 A1 * 9/2002 Takeda .................. G01N 19/02 73/818
2014/0346894 A1 * 11/2014 Csicsay ................ H01M 10/48 307/116
2015/0332522 A1 11/2015 Komada et al.
2018/0329408 A1 * 11/2018 Schultalbers ...... G05B 23/0294
2019/0141074 A1 5/2019 Oka
2019/0312892 A1 * 10/2019 Chung .................. G06F 21/554
2020/0293034 A1 * 9/2020 Shibata ............... G01M 17/007
2021/0287460 A1 9/2021 Aono et al.
2022/0402515 A1 12/2022 Aono et al.

FOREIGN PATENT DOCUMENTS

EP 1219946 A2 * 7/2002 .......... G01M 17/007
EP 2947448 A1 * 11/2015 ........ G01M 17/0072
JP 2002257688 A 9/2002
JP 2006323776 A 11/2006
JP 2017033149 A 2/2017
JP 2017214049 A 12/2017
JP 2018190349 A 11/2018
JP 2019174426 A 10/2019
WO WO-2019133696 A1 * 7/2019 ............ G01M 15/02
WO 2020059570 A1 3/2020
WO WO-2020068826 A1 * 4/2020 ......... H04L 63/1416
WO 2021075089 A1 4/2021

OTHER PUBLICATIONS

EESR dated Jul. 3, 2025 issued in EP patent application No. 22849434.0.

Office Action dated May 6, 2026 issued in CN patent application No. 202280051654.X.

Hyunjae Kang et al., “Car Hacking and Defense Competition on In-Vehicle Network”, Workshop on Automotive and Autonomous Vehicle Security (AutoSec) Feb. 25, 2021, p. 1-6.

* cited by examiner

TEST SYSTEM, TEST METHOD, AND NON-TRANSITORY COMPUTER READABLE MEDIUM FOR TEST SYSTEM

CROSS-REFERENCE TO RELATED APPLICATIONS

This application is the U.S. national phase of PCT Application No. PCT/JP2022/028632, filed Jul. 25, 2022, which claims priority to Japanese Patent Application No. 2021-121884, filed Jul. 26, 2021, the disclosures of which are incorporated in their entirety by reference herein.

TECHNICAL FIELD

The present invention relates to a test system, a test method and a program recording medium for a test system for testing vehicles.

BACKGROUND ART

Connected cars and the like, which have been increasing in number in recent years, are constantly exposed to the threat of malicious cyberattacks thanks to, for example, being connected to external networks such as the internet. Beyond just connected cars, vehicles which connect to external equipment via an electric cable, such as electric vehicles, are similarly exposed to the threat of malicious cyberattacks. It is for this reason that, in recent years, connected cars and the like are being equipped with a cyber security function that detects and determines abnormalities in equipment caused by malicious cyberattacks (e.g., Patent Document 1). Furthermore, each vehicle manufacturer is required to perform testing and verify that the cyber security function installed in the vehicles they develop is effective and that the software update function of the vehicles is appropriate.

PRIOR ART LITERATURE

Patent Literature

Patent Literature 1: JP2019-174426A

SUMMARY OF THE INVENTION

Problem to be Solved by the Invention

However, when it comes to evaluating the cyber security function or the software update function of a vehicle, there are safety issues in transmitting, for example, a test signal that imitates a cyberattack or a test signal that imitates an unauthorized software update program or the like to a test vehicle being driven on an actual road. Be that as it may, it is not possible to evaluate the behavior of a vehicle in a driving environment by transmitting a test signal to a stationary test vehicle.

The present invention was developed in view of the above issues, and its primary objective is to make it possible to conduct a test for evaluating a cyber security function and a software update function of a vehicle while ensuring safety.

Means of Solving the Problem

That is, the test system of the present invention is a test system that conducts a test of a test subject that is a vehicle or a part thereof that includes an electronic control device, said test system comprising a drive test device for conducting a drive test of the test subject; an automatic driving robot that drives the test subject; and a signal control unit that is connected to the test subject by wire or wirelessly and that transmits, to the electronic control device, a test signal for evaluating the electronic control device.

With a configuration like this, without driving the vehicle on an actual road, the driving environment of the vehicle is reproduced on a test bench by controlling the drive test device and the automatic driving robot, and, in this state, for example, a test signal that can cause a change in the behavior of the vehicle or a part thereof is input. Therefore, it is possible to conduct a test for evaluating a cyber security function and/or software update function or the like of the vehicle while ensuring safety.

It is preferable that the test subject is brought into a predetermined state in which the test can be initiated by controlling at least one of the automatic driving robot and the drive test device; and the signal control unit inputs the test signal to the electronic control device in this state.

This way, since it is possible to automatically create predetermined initial conditions for conducting a test before a test signal is input, it is possible to automatically carry out a plurality of consecutive tests.

It is preferable that the drive test device is a bench test device including a rotating body on which a wheel of the test subject is mounted, and the rotating body is supported to be rotatable in accordance with a steering direction of the mounted wheel.

This way, when the steering wheel of the test subject vehicle is turned suddenly, for example by inputting a test signal, since the rotating body on which a wheel is mounted will follow this and rotate in the same direction, the danger of the vehicle flying off the test bench can be reduced.

It is also preferable that the test system be one wherein the signal control unit obtains a response signal output from the electronic control device when the test signal is input, and the test system further comprises a storage part that associates and stores the test signal and the response signal.

This way, since a test signal is generated by the signal control unit, and the generated test signal and the response signal of the electronic control device at that time are associated with each other and stored in the storage part, the work of generating a test signal and the work of recording the response signal of the electronic control device at that time can be done automatically using a computer, rather than the test operator having to do it manually while operating the vehicle. Thanks to this, it is possible to conduct a test for evaluating the cyber security function and/or software update function or the like included in the electronic control device in a simple way which does not require a high level of skill or know-how.

It is also preferable that the test system further includes a test subject monitoring unit that monitors behavior of the test subject, and that the storage part further associates and stores behavior information indicating the behavior of the test subject when the test signal is input.

This way, it is possible to automatically store the generated test signal and the behavior of the test subject at that time, and test automation can be better achieved.

It is also preferable that the test system be one wherein, when predetermined behavior that has an influence on safety of the test subject is detected by the test subject monitoring unit, a stop sequence is executed in at least one of the drive test device and the automatic driving robot.

This way, since the test is stopped when predetermined behavior which has an influence on safety of the test subject is detected, it is possible to immediately check the test signal that caused the abnormal behavior as well as its cause and the like.

As a specific example of the test subject monitoring unit, one including a camera that captures still or moving pictures of the test subject is given. This camera may be one that captures still or moving pictures of an exterior or an interior of the test subject.

This way, it is possible to record changes in external behavior exhibited by the test subject when a test signal is input.

As another specific example of the test subject monitoring unit, one is given that is configured to measure electric current or electromagnetic waves in the test subject.

This way, when the test signal is input, it is possible to record changes in the behavior of the test subject that is not exhibited externally.

As a specific aspect of the test signal, one including a cyber security test signal for evaluating a cyber security function of the electronic control device, or a software update test signal for evaluating a software update function of the electronic control device is given.

As a specific aspect of the cyber security test signal, one including a functionality test signal for carrying out a functionality test, a vulnerability scan signal for carrying out a vulnerability scan, a fuzz test signal for carrying out a fuzz test, or a penetration test signal for carrying out a penetration test is given.

As a specific aspect of the software update test signal, one which imitates a software update program of the electronic control device is given.

Also, a test method of the present invention is characterized in being a test method for conducting a test of a test subject that is a vehicle or a part thereof that includes an electronic control device, comprising controlling the test subject via at least one of a drive test device for conducting a drive test of the test subject or an automatic driving robot that drives the test subject; and transmitting, to the electronic control device, a test signal for evaluating the electronic control device by wired communication or wireless communication.

Also, according to the present invention, a program recording medium for a test system is characterized in being one on which is stored a program for a test system that conducts a test of a test subject that is a vehicle or a part thereof that includes an electronic control device and that causes a computer to function as: at least one of a drive test device control unit that controls a drive test device for conducting a drive test of the test subject and an automatic driving robot control unit that controls an automatic driving robot that drives the test subject; and a signal control unit that transmits, to the electronic control device, a test signal for evaluating the electronic control device by wired communication or wireless communication.

According to this type of test method and program recording medium for a test system of the present invention, it is possible to achieve the same operative effects as the test system of the present invention described above.

Effects of the Invention

According to the present invention configured in this way, it is possible to conduct a test for evaluating a cyber security function and/or a software update function of a vehicle while ensuring safety.

SIMPLE EXPLANATION OF THE DRAWINGS

FIG. 1: Diagram schematically showing the overall configuration of a test system in this embodiment.

Figure 2:
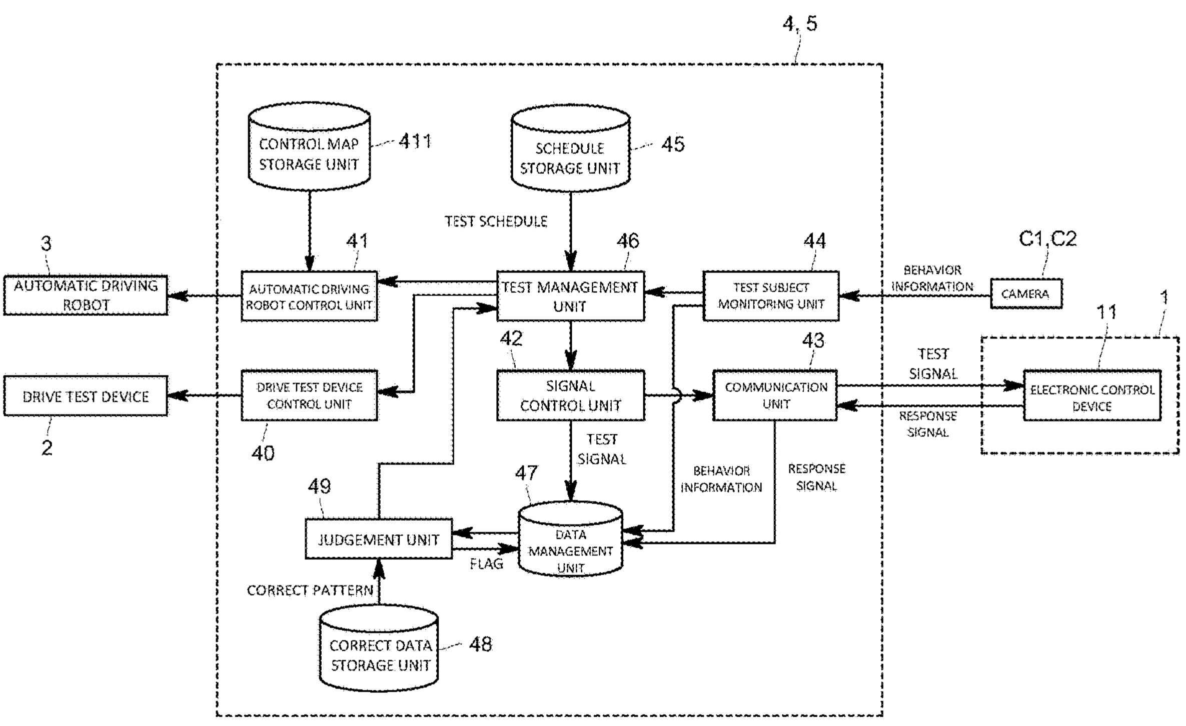

FIG. 2: Functional block diagram of the test system in the same embodiment.

Figure 3:
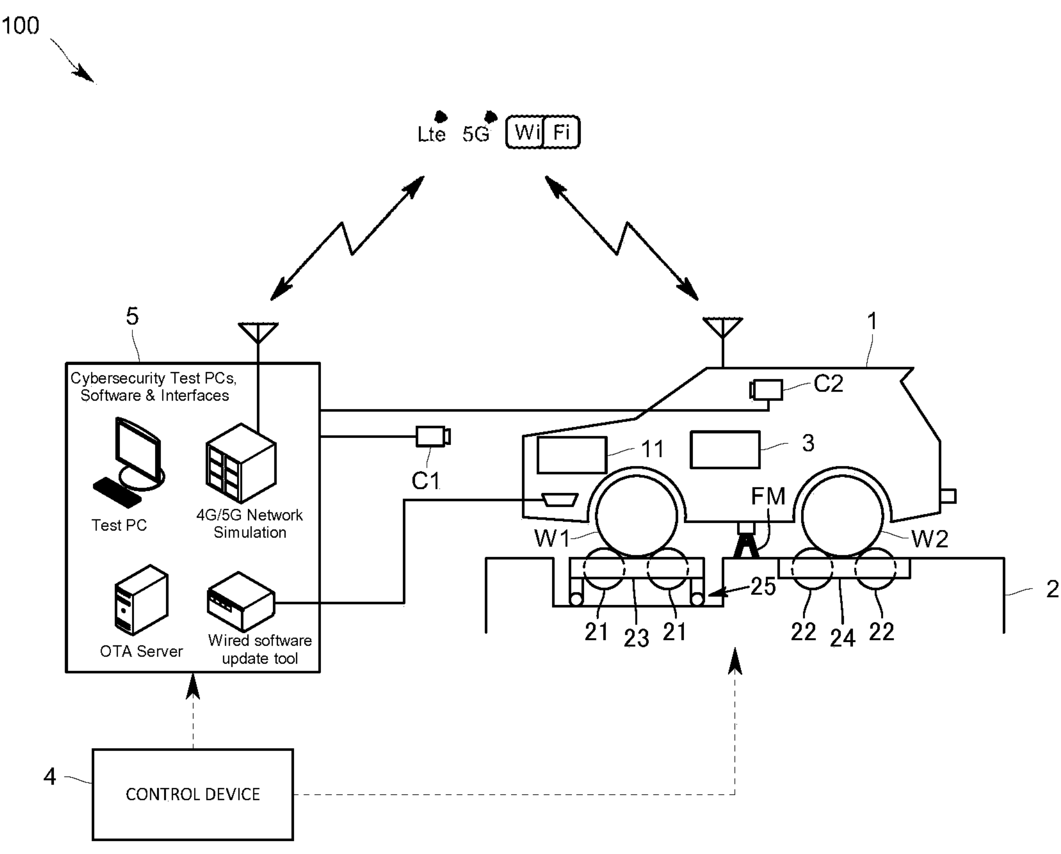

FIG. 3: Diagram schematically showing the overall configuration of a test system in another embodiment.

Figure 4:
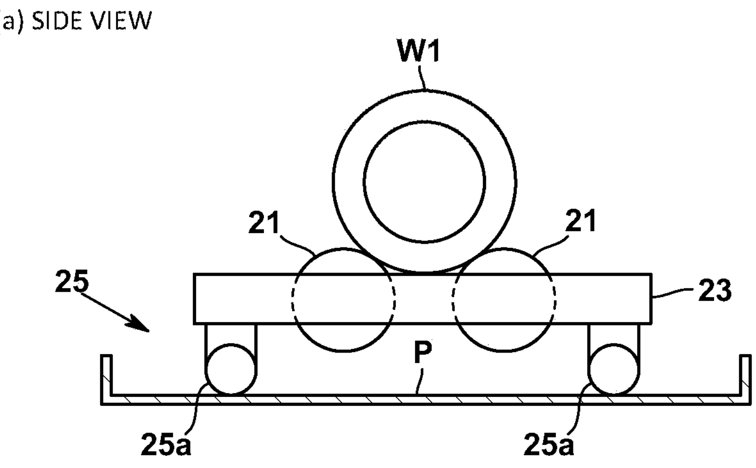
Figure 4:
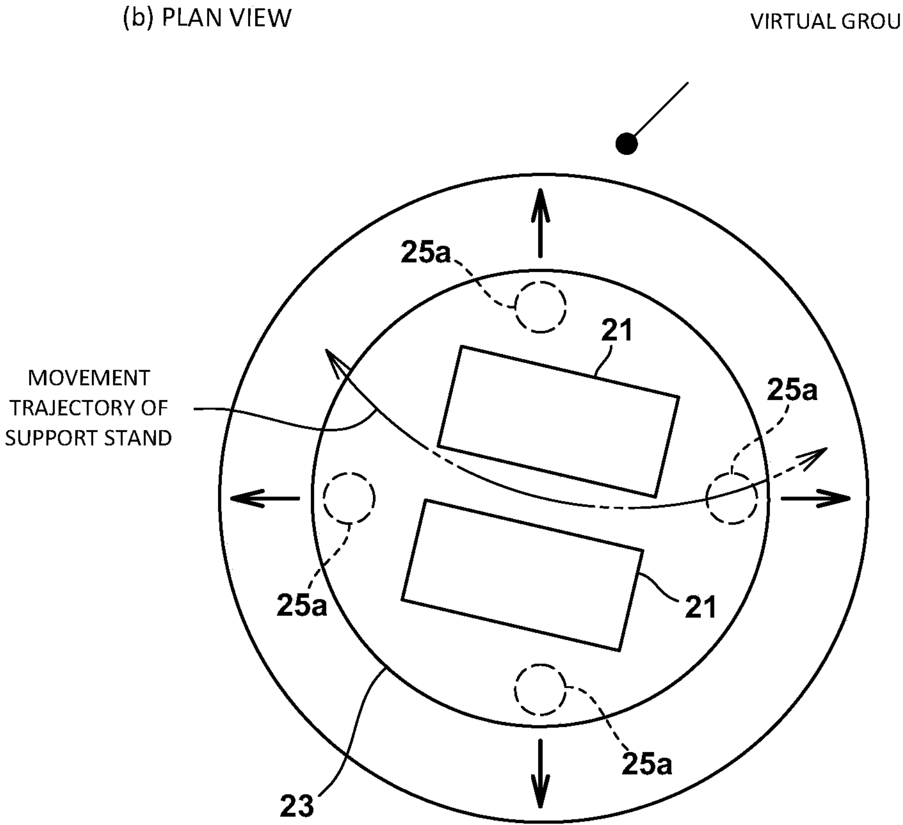

FIG. 4: Schematic (a) side view and (b) plan view of a configuration of a rotating body, a support stand, and a moving mechanism of another embodiment.

Figure 5:
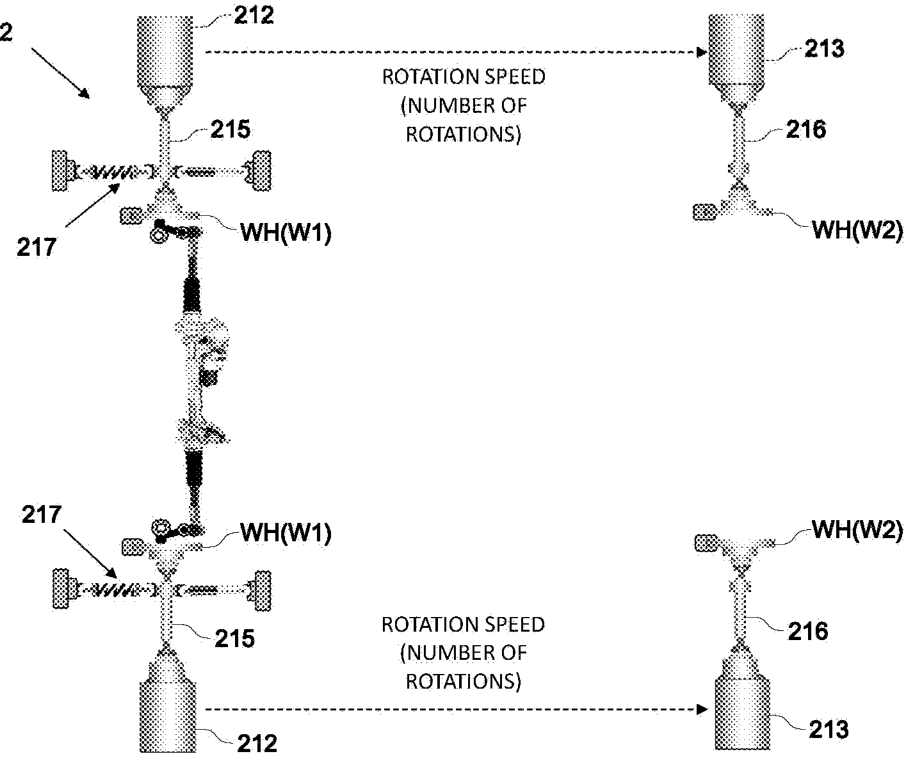

FIG. 5: Diagram schematically showing a configuration of the drive test device in another embodiment.

MEANS FOR CARRYING OUT THE INVENTION

A test system 100 according to one embodiment of the present invention is explained below with reference to the drawings.

The test system 100 of this embodiment causes a vehicle 1, which is a test subject, to run in a test chamber and in that running state inputs a test signal to an electronic control device 11 equipped in the vehicle 1, and is for evaluating a cyber security function and/or a software update function or the like included in the electronic control device 11 (e.g., an electronic control unit or 'ECU').

More concretely, as shown in FIG. 1, the test system 100 includes a drive test device 2 for conducting a drive test by causing an engine or a motor of the vehicle 1 to be driven, an automatic driving robot 3 which drives the vehicle 1, a control device 4, and a test device 5. In the test system 100, the drive test device 2 or the automatic driving robot 3 are controlled by the control device 4, creating a state for conducting a test of the vehicle 1; in this state, a test signal is transmitted from the test device 5 to the vehicle 1 by wireless communication or wired communication, and the cyber security function and/or the software update function included in the electronic control device is evaluated.

The drive test device 2 is a bench test device for conducting a running test of the vehicle 1 atop a bench, and more specifically is a chassis dynamometer. The drive test device 2 is, for example, a single-axle type, having a rotating body 21 on which a drive wheel W1 of vehicle 1 is mounted and a dynamometer (not shown) as a power absorbing unit connected to the rotating body 21. The dynamometer is configured to provide a running load to the vehicle 1 like that of on a road, based on a control signal transmitted from the control device 4. In the drive test device 2, the vehicle 1 is fixed in place via a fixing mechanism FM so that the drive wheel W1 does not become disengaged from the rotating body 21. A configuration in which the fixing mechanism FM fixes the drive wheels W1 in place is also possible. Moreover, FIG. 1 shows a 2WD FF vehicle, but of course it goes without saying that a pair of rotating bodies 2 may instead be provided in the front and rear to be suitable for 4WD, and that a two-axle type is also possible.

The automatic driving robot 3 is, for example, installed in the driver's seat of the vehicle 1, and includes a plurality of actuators for operating, respectively, the accelerator pedal, brake pedal, shift lever, ignition key, or operation switches for driver assistance functions such as, for example, cruise control, of the vehicle 1. Based on a predetermined control signal transmitted from the control device 4, the automatic driving robot 3 is configured to operate each of the actuators, and to drive the vehicle 1 automatically.

The control device 4 and the test device 5 are a dedicated or general-purpose computer(s) equipped with a CPU, internal memory, input/output interface, an A/D converter, etc. Furthermore, the control device 4 and the test device 5 are such that the CPU and peripheral devices cooperate based on a predetermined program stored in the internal memory so as to perform the functions of, as shown in FIG. 2, at least a drive test device control unit 40, an automatic driving robot control unit 41, a control map storage unit 411, a signal control unit 42, a communication unit 43, a test subject monitoring unit 44, a schedule storage unit 45, a test management unit 46, a data management unit 47, a correct data storage unit 48, and a judgment unit 49.

Each of these machine functions may be performed by either the control device 4 or the test device 5. For example, the control device 4 may perform the functions of managing test schedules and/or test data, as well as controlling each of the peripherals, while the test device 5 may perform the functions of receiving control signals from the control device 4 and sending and receiving test signals and response signals to and from the vehicle 1. More concretely, the control device 4 may perform the functions of, for example, the drive test device control unit 40, the automatic driving robot control unit 41, the control map storage unit 411, the schedule storage unit 45, the test management unit 46, the data management unit 47, the correct data storage unit 48, and the judgment unit 49; while the test device 5 may perform the functions of the signal control unit 42, the communication unit 43, and the test subject monitoring unit 44.

The drive test device control unit 40 transmits a predetermined control signal to the drive test device 2 to cause the vehicle 1 mounted on the drive test device 2 to run in a predetermined running state.

The automatic driving robot control unit 41 is one that refers to a control map stored in the control map storage unit 411 and transmits a control signal to each actuator of the automatic driving robot 3, and causes the vehicle 1 to be driven automatically.

The control map storage unit 411 may store a plurality of different control maps for controlling the automatic driving robot 3. A 'control map' refers to data showing, for example, the relationship between various different opening levels of the accelerator of vehicle 1 and vehicle speed and acceleration, and is calculated ahead of time by learning driving. Moreover, it is possible to make the automatic driving robot 3 itself include the functions of the automatic driving robot control unit 41 and the control map storage unit 411.

The signal control unit 42 is connected by wire or wirelessly to the vehicle 1 via the communication unit 43, and transmits, to the electronic control device 11, a test signal for evaluating the electronic control device 11. Specifically, as the test signal, the signal control unit 42 transmits, to the electronic control device 11, one or both of a cyber security test signal for evaluating a cyber security function of the electronic control device 11 and a software update test signal for evaluating a software update function of the electronic control device 11.

The cyber security test signal is a signal for verifying the effectiveness of cyber security measures which have been applied to the electronic control device 11 provided in the vehicle 1. More concretely, the cyber security test signal includes one or more of, for example, a functionality test signal for carrying out a functionality test, a vulnerability scan signal for carrying out a vulnerability scan, a fuzz test signal for carrying out a fuzz test, and a penetration test signal for carrying out a penetration test.

The functionality test is, for example, a test to verify that the level of encryption for communication is set correctly. The vulnerability scan is, for example, a test to identify vulnerabilities in the electronic control device 11 using information about known vulnerabilities or known attack patterns associated with the electronic control device 11. The fuzz test is a test to, for example, check the behavior of the vehicle 1 by inserting unexpected parameters into the communication protocol. The penetration test is, for example, a test to check for whether or not there are vulnerabilities in the electronic control device 11 by attempting penetration of the electronic control device 11 via a transmission.

The software update test signal is a signal for verifying that the electronic control device 11 provided in the vehicle 1 can properly perform software updates. Concretely, the software update test signal imitates a software update program of the electronic control device 11, and includes, for example, an effective software update program, an ineffective software update program, or an unauthorized software update program, etc.

The communication unit 43 sends and receives data to and from the vehicle 1 by wired communication or wireless communication. The communication unit 43, in addition to sending various test signals output by the signal control unit 42 to the vehicle 1 (specifically, the electronic control device 11), also receives, from the electronic control device 11, a response signal (also referred to as an electronic control device 11 output signal) which is output from the electronic control device 11 when a test signal is sent. Specifically, as for wired communication, the communication unit 43 sends and receives data by a cable or harness or the like connected to various input ports of the vehicle 1 such as, for example, a charging port, an OBD port (a connector for diagnostic equipment), or a USB port. Or, as for wireless communication, the communication unit 43 sends and receives data using, for example, wireless LAN, short-range wireless communication (Bluetooth, etc.), a mobile communication system (4G, 5G, etc.), keyless entry, wireless from a tire pressure sensor, GPS, GNSS, or V2X communication.

The test subject monitoring unit 44, in addition to monitoring behavior of the vehicle 1 which is the test subject, transmits behavior information showing behavior of the vehicle 1 to the test management unit 46 and the data management unit 47. The behavior of vehicle 1 refers to, for example, external behavior (e.g., wheel orientation, headlights, on/off state of the wipers, meter panel display, or on/off state of the air conditioner) or internal behavior (e.g., behavior of electric current or electromagnetic waves in the electronic control device, or behavior of internal communications of the vehicle) that is expressed by the vehicle 1 when the test signal is input. Concretely, the test subject monitoring unit 44 includes a camera C1 which captures still or moving pictures of the vehicle from its exterior, a camera C2 which captures still or moving pictures of the interior of the vehicle, or a sensor which measures the electric current or electromagnetic waves in the vehicle 1, etc.

The schedule storage unit 45 is set up in a predetermined area of memory and stores a test schedule which has been input ahead of time by an operator. The execution order of a plurality of test items included in a test and the operation of each test device in each test item are included in the test schedule. The operation of each test device includes, for example, an operation to create an initial state of the drive test device 2 and/or the automatic driving robot 3 when each test is initiated (specifically, when a test signal is transmitted).

The test management unit 46 manages the schedule of a test. Concretely, the test management unit 46 respectively outputs a command signal to the drive test device control unit 40, the automatic driving robot control unit 41, and the signal control unit 42 based on a test schedule stored in the schedule storage unit 45, and controls each device such that each test item of the test is automatically carried out according to the set schedule.

Concretely, before various test signals are sent by the signal control unit 42, the test management unit 46 first transmits a command signal to the automatic driving robot control unit 41 and the drive test device control unit 40 and sets the vehicle 1 in a predetermined initial state in which testing can begin. This initial state is set beforehand in accordance with the content of each test to be performed, and includes a running state and/or a stopped state of the vehicle 1. Then, when the vehicle 1 is set in the initial state, the test management unit 46 transmits a command signal to the signal control unit 42, and a test signal is transmitted to the vehicle 1.

The test management unit 46 is also configured to transmit a command signal to at least one of the automatic driving robot control unit 41 and the drive test device control unit 40 based on behavior information received from the test subject monitoring unit 44. Specifically, if the behavior of the vehicle 1 indicated by the acquired behavior information could affect the safety of the vehicle 1 itself or its surroundings, the test management unit 46 causes at least one of the automatic driving robot control unit 41 and the drive test device control unit 40 to execute a stop sequence and the vehicle 1 is made to stop.

The data management unit 47 obtains the test signal sent by the signal control unit 42 and the response signal outputted from the electronic control device 11, and associates them and stores them as a time series. The data management unit 47 may also receive behavior information indicating behavior of the vehicle 1 when the test signal is sent to the electronic control device 11, and associate it with the test signal and response signal and store it as a time series.

The correct data storage unit 48 associates and stores a test signal sent from the signal control unit 42 and a response signal which should be output (is expected to be output) from the electronic control device 11 when said test signal is sent, and this is stored as response signal correct data. Also, the correct data storage unit 48 associates and stores the transmitted test signal transmitted from the signal control unit 42 and the expected behavior of the vehicle 1 when said test signal is sent, and stores this as vehicle behavior correct data.

The correct data may be input ahead of time by an operator, or may be obtained ahead of time using the test system 100. For example, an electronic control device which is certain to output a correct response signal (the response signal which should be output) in regards to a test signal may be prepared, and the response signal obtained by transmitting the test signal to said electronic control device may be obtained and used as correct data. Or, a vehicle may be prepared which is equipped with this type of electronic control device which is certain to operate correctly, and the behavior of the vehicle when a test signal is sent to the electronic control device may be obtained and used as the correct data. Also, in cases in which the correct behavior of the vehicle in regards to a test signal is such that 'the behavior should not change,' behavior of the vehicle in a state in which the test signal is not transmitted may be obtained, and this may be used as the correct data. Similarly, a signal outputted from the electronic control device in a state in which a test signal has not been sent may be obtained, and this may be used as the correct data. Also, without using the test system 100, a signal output from the electronic control device during running on an actual road may be obtained, and this may be used as the correct data.

The judgment unit 49 compares the association of the test signal and the response signal or the behavior information obtained by the data management unit 47 to the correct data stored in the correct data storage unit 48, and judges (error judgment) whether the obtained response signal or behavior information is in agreement with the response signal or behavior information shown in the correct data. This error judgment is, for example, made immediately after the data management unit 47 obtains each new response signal or piece of behavior information. If the obtained response signal or behavior information is judged to not be in agreement with the correct data, the judgment unit 49 then outputs an error signal to the data management unit 47 and the test management unit 46. The data management unit 47 which has received the error signal stores the test signal which is not in agreement with the correct data with a flag to distinguish it from the other test signals. When an error signal is obtained, the test management unit 46 also outputs a command to the automatic driving robot control unit 41, the drive test device control unit 40, and the signal control unit 42, and the test is brought to a stop.

Since the test system 100 according to this embodiment configured as such reproduces a running environment of the vehicle 1 on a test bench by controlling the drive test device 2 and the automatic driving robot 3 without the vehicle 1 being made to run on an actual road, and a test signal which is able to, for example, exert a change in the behavior of the vehicle 1 or a part thereof is made to be input in this state, it is possible to perform a test for evaluating the cyber security function and/or the software update function, etc., of the vehicle 1 while ensuring safety.

Moreover, the present invention is not limited to the above-described embodiment.

For example, the test system 100 according to another embodiment may be one that includes at least a drive test device 2 for conducting a drive test of a test subject which is a vehicle 1 equipped with an electronic control device 11 or the like, an automatic driving robot 3 which drives the test subject, and a signal control unit 42 which is connected by wire or wirelessly to the test subject and transmits a test signal for evaluating an electronic control device 11 to the electronic control device 11. If the test system 100 is configured to include at least these, it is possible to carry out a test for evaluating the cyber security function or software update function of the vehicle while ensuring safety.

Also, in the above-described embodiment, the vehicle 1 was used as the test subject, but it is not limited to this. In another embodiment, as long as the test subject includes an electronic control device 11, a part of the vehicle 1 may be used as the test subject, or a powertrain may be used as the test subject.

Also, the drive test device 2 of another embodiment may be configured such that the rotating body 21 on which a steered wheel of the vehicle 1 is mounted is supported so as to be rotatable in accordance with the steering direction of the steered wheel. For example, as shown in FIG. 3 and FIG. 4, the drive test device 2 of another embodiment may include a moving mechanism 25 which moves a support stand that rotatably supports a rotating body on which a steered wheel is mounted, using a rotation force generated based on the steering of the wheel being steered. In this embodiment, an example is shown in which a drive wheel W1 is the steered wheel, and the moving mechanism 25 moves a support stand 23 (hereafter, drive wheel side support stand 23) which rotatably supports a drive wheel side rotating body 21 using rotation force generated based on steering of the drive wheel W1. Moreover, the moving mechanism 25 need only use at least part of the rotation force of the drive wheel W1, and the movement may be assisted by a separate moving assistance mechanism not shown.

Specifically, the moving mechanism 25 may move the drive wheel side support stand 23 in accordance with the steering angle of the steered drive wheel W1, and may be configured with a rolling body 25*a* provided to the support stand 23, such that the rolling body 25*a* moves on an installation surface P on which the support stand 23 is installed. The drive wheel side support stand 23 is able to move in a free trajectory thanks to the moving mechanism 25. Here, the movement trajectory of the drive wheel side support stand 23 due to steering is movement in which a virtual grounding point extending from the kingpin (the pin in the center of steering rotation of the steered wheel) is the center of rotation (see FIG. 4(*b*)).

The drive test device 2 of another embodiment, rather than being configured so as to use a rotating body 21 on which a wheel W1, W2 is mounted, may be configured to be connected to a wheel or rotary shaft of the wheel W1, W2, as is described below. That is, as shown in FIG. 5, the drive test device 2 of another embodiment may be configured such that a motor 212 is connected to the wheel WH or the rotary shaft of the drive wheel W1. It may also be configured such that a motor 213 is connected to wheel WH or the rotary shaft of the driven wheel W2, and the driven wheel W2 is made to rotate by the motor 213 based on the rotation speed of the drive wheel. In the case wherein the motor 212 is connected to the wheel WH or rotary shaft of the drive wheel W1, which is the steered wheel, it is possible to use an expanding and contracting structure 215 with a spline function or the like having a joint with a floating function such as a constant velocity joint or a universal joint, etc. This allows the steering movement of the drive wheel W1 to be followed, as well as rotation from the drive wheel W1 to be transmitted. Even for cases wherein the motor 213 is connected to the wheel WH or rotary shaft of the driven wheel W2, an expanding and contracting structure 216 with a spline structure or the like may be used. A configuration is also possible wherein a steering reaction force input device 217 is connected to an expanding and contracting structure 215 which has been connected to the wheel WH or rotary shaft of the drive wheel W1 which is the steered wheel, and a steering reaction force (a centering force) is generated. Moreover, it is also possible to carry out a bench-top test of a four-wheel drive vehicle 1 by having the motor 213 connected to the wheel WH of the driven wheel W2 freely rotate. By using a drive test device 2 such as this, the vehicle height can be made to be equivalent to that of driving on an actual road, and the reliability of the test can be improved.

The drive test device 2 of another embodiment is not limited to a chassis dynamometer, but may instead be a dynamometer which tests the powertrain of the vehicle 1 or a part thereof, or a dynamometer for engine or motor testing.

Also, the vehicle 1 of the aforementioned embodiment is equipped with an engine, but it is not limited to this. The vehicle 1 of other embodiments may be one driven by a motor via an electric energy source; for example, an EV (electric vehicle), a PHV (plug-in hybrid vehicle), or a fuel cell vehicle. The vehicle is not limited to four-wheeled vehicles, and may also include two-wheeled automobiles such as motorbikes.

In the test system 100 of the aforementioned embodiment, the test management unit 46 automatically gives commands to the signal control unit 42, the drive test device control unit 40, and the automatic driving robot control unit 41 based on a set test schedule, but it is not limited to this. In another embodiment, only some of these may be automatically commanded based on the test schedule. Or, in another embodiment, it is possible that a test management unit 46 is not used, and the operator themself may perform the operations.

In the test system 100 of the aforementioned embodiment, the test is made to stop when the test management unit 46 receives an error signal, but it is not limited to this. In another embodiment, the test may be continued even if a response signal or behavior information is received which does not match the correct data.

The test system 100 of another embodiment may not include the test subject monitoring unit 44.

Another embodiment may be configured such that each functional unit performed by the control device 4 and the test device 5 may instead be performed by a different device.

In the test system 100 of another embodiment, the test signal output to the vehicle 1 may be a signal for deceiving a sensor (e.g., LiDAR) that the vehicle 1 is equipped with. For example, it may be configured to output, as test signal, signals for deceiving various sensors such as LiDAR, radar, onboard cameras, ultrasonic sensors, etc.

Needless to say, the present invention is not limited to the aforementioned embodiments, and various modifications are possible without departing from its intent.

INDUSTRIAL APPLICABILITY

According to the present invention described above, it is possible to carry out a test for evaluating the cyber security function and/or software update function of a vehicle while ensuring safety.

EXPLANATION OF REFERENCE SIGNS

100 test system
1 vehicle
11 electronic control device
2 drive test device
3 automatic driving robot
4 control device
40 drive test device control unit
41 automatic driving robot control unit
42 signal control unit
43 communication unit

The invention claimed is:

1. A test system that conducts a test of a test subject that is a vehicle or a part thereof equipped with an electronic control device, comprising:
- a drive test device for conducting a drive test of the test subject;
- an automatic driving robot that drives the test subject;
- a test management unit configured to bring the test subject into a predetermined state defined by at least a vehicle speed and a running load applied by the drive test device, in which a test for evaluating a cyber security function of the electronic control device can be initiated, by controlling at least one of the drive test device or the automatic driving robot;
- a signal control unit that is connected to the test subject by wire or wirelessly and that, while the test subject is maintained in the predetermined state, transmits to the electronic control device a cyber security test signal for evaluating a cyber security function of the electronic control device, the cyber security test signal simulating an unauthorized control input under the predetermined state;

a correct data storage unit that stores correct data in which the cyber security test signal is associated with a response signal expected to be output from the electronic control device when the cyber security test signal is transmitted under the predetermined state, and with an expected behavior of the test subject under the predetermined state; and a judgment unit configured to judge whether the response signal output from the electronic control device or behavior information of the test subject under the running load applied by the drive test device agree with the correct data.

2. The test system according to claim 1, wherein the drive test device is a bench test device including a rotating body on which a wheel of the test subject is mounted, and the rotating body is supported to be rotatable in accordance with a steering direction of the wheel.

3. The test system according to claim 1, wherein the signal control unit obtains a response signal output from the electronic control device when the cyber security test signal is input, and the test system further comprises a storage part that associates and stores the cyber security test signal and the response signal output.

4. The test system according to claim 3, further comprising a test subject monitoring unit that monitors behavior of the test subject, wherein the storage part further associates and stores behavior information indicating behavior of the test subject when the cyber security test signal is input.

5. The test system according to claim 4, wherein when predetermined behavior that has an influence on safety of the test subject is detected by the test subject monitoring unit, a stop sequence is executed in at least one of the drive test device or the automatic driving robot.

6. The test system according to claim 4, wherein the test subject monitoring unit includes a camera that captures still or moving pictures of the test subject.

7. The test system according to claim 4, wherein the test subject monitoring unit is configured to measure electric current or electromagnetic waves in the test subject.

8. The test system according to claim 1, wherein the cyber security test signal includes a functionality test signal for carrying out a functionality test, a vulnerability scan signal for carrying out a vulnerability scan, a fuzz test signal for carrying out a fuzz test, or a penetration test signal for carrying out a penetration test.

9. A test method for conducting a test of a test subject that is a vehicle or a part thereof that includes an electronic control device, the test method comprising:

controlling the test subject via at least one of a drive test device for conducting a drive test of the test subject or an automatic driving robot that drives the test subject to bring the test subject into a predetermined state defined by at least a vehicle speed and a running load applied by the drive test device; and while the test subject is maintained in the predetermined state, transmitting, to the electronic control device, a cyber security test signal for evaluating a cyber security function of the electronic control device the cyber security test signal simulating an unauthorized control input under the predetermined state;

storing correct data in which the cyber security test signal is associated with a response signal expected to be output from the electronic control device when the cyber security test signal is transmitted under the predetermined state, and with an expected behavior of the test subject under the predetermined state; and determining whether a response signal output from the electronic control device or behavior information of the test subject under the running load applied by the drive test device agree with the correct data.

10. A non-transitory computer readable medium on which is stored a program for a test system that conducts a test of a test subject that is a vehicle or a part thereof that includes an electronic control device, the program when executed by a computer causes the computer to function as:

at least one of a drive test device control unit that controls a drive test device for conducting a drive test of the test subject and an automatic driving robot control unit that controls an automatic driving robot that drives the test subject to bring the test subject into a predetermined state defined by at least a vehicle speed and a running load applied by the drive test device; and a signal control unit that, while the test subject is maintained in the predetermined state, transmits, to the electronic control device, a cyber security test signal for evaluating a cyber security function of the electronic control device by wired communication or wireless communication, cyber security test signal simulating an unauthorized control input under the predetermined state;

a correct data storage unit that stores correct data in which the cyber security test signal is associated with a response signal expected to be output from the electronic control device when the cyber security test signal is transmitted under the predetermined state, and with an expected behavior of the test subject under the predetermined state; and a judgment unit configured to determine whether a response signal output from the electronic control device or behavior information of the test subject under the running load applied by the drive test device agree with the correct data.

* * * * *